(12) United States Patent
Ammann

(10) Patent No.: US 8,974,159 B1
(45) Date of Patent: Mar. 10, 2015

(54) VEHICLE LOAD SECURING APPARATUS

(71) Applicant: Myles Ammann, Wilmot, SD (US)

(72) Inventor: Myles Ammann, Wilmot, SD (US)

(*) Notice: Subject to any disclaimer, the term of this patent is extended or adjusted under 35 U.S.C. 154(b) by 0 days.

(21) Appl. No.: 14/076,629

(22) Filed: Nov. 11, 2013

Related U.S. Application Data

(63) Continuation-in-part of application No. 13/447,966, filed on Apr. 16, 2012, now Pat. No. 8,678,728.

(51) Int. Cl.
*B61D 45/00* (2006.01)
*B60P 7/08* (2006.01)

(52) U.S. Cl.
CPC .................................... *B60P 7/0846* (2013.01)
USPC ................................. 410/96; 410/97; 410/104

(58) Field of Classification Search
USPC ........... 410/96, 100, 97, 103, 109, 11, 12, 23, 410/34, 102, 106, 116, 112, 117, 118; 224/403, 534, 568; 248/499
See application file for complete search history.

(56) References Cited

U.S. PATENT DOCUMENTS

| | | | |
|---|---|---|---|
| 2,946,563 A * | 7/1960 | Eaton | 410/37 |
| 4,842,458 A | 6/1989 | Carpenter | |
| 5,282,706 A | 2/1994 | Anthony | |
| 5,941,666 A | 8/1999 | Waters | |
| 5,961,263 A | 10/1999 | Nunez | |
| 6,059,499 A | 5/2000 | Bird | |
| 6,200,079 B1 * | 3/2001 | Little | 410/103 |
| 6,626,621 B1 | 9/2003 | Hugg | |
| 7,090,449 B1 * | 8/2006 | Hugg | 410/102 |
| 7,334,972 B2 | 2/2008 | Cash | |
| 7,464,916 B1 * | 12/2008 | Drinkhorn | 254/243 |
| 8,272,819 B1 * | 9/2012 | Adams | 410/97 |

* cited by examiner

*Primary Examiner* — Glenn Dayoan
*Assistant Examiner* — Sunsurraye Westbrook
(74) *Attorney, Agent, or Firm* — Jeffrey A. Proehl; Woods, Fuller, Shultz & Smith, P.C.

(57) ABSTRACT

A vehicle load securing apparatus comprising a frame including opposite side walls and an end wall extending between the side walls, with the frame having open sides positioned in opposition to each other. A spool is rotatably mounted on the frame and includes a rotating shaft, and a length of an elongate member at least partially wrapped about the spool with a hook mounted thereon. A ratcheting structure may control rotation of the spool with engaged position in which the ratcheting structure resists rotation of the spool in an unwind direction and a disengaged position in which the ratcheting structure permits rotation of the spool in the unwind direction. The shaft may have a first end portion extending through one of the side walls of the frame, and a section of the first end portion having a substantially hexagonal cross-sectional shape for engagement by a tool.

17 Claims, 15 Drawing Sheets

US 8,974,159 B1

VEHICLE LOAD SECURING APPARATUS

REFERENCE TO RELATED APPLICATION

This application is a continuation-in-part of U.S. patent application Ser. No. 13/447,966 filed Apr. 16, 2012, which is hereby incorporated by reference in its entirety.

BACKGROUND

Field

The present disclosure relates to load securing devices and more particularly pertains to a new vehicle load securing apparatus that is easily mountable to a vehicle for load securement and conveniently storable when not being used.

SUMMARY

In one aspect, the present disclosure relates to a vehicle load securing apparatus for mounting on a vehicle to secure a load to a load bed of the vehicle. The apparatus may comprise a frame for mounting on the load bed of the vehicle, and the frame may include opposite side walls and an end wall extending between the side walls, with the frame having open sides positioned in opposition to each other. A spool may be rotatably mounted on the frame and including a rotating shaft. A length of an elongate member may be at least partially wrapped about the spool, with a secured end of the elongate member being secured to the spool and a hook being mounted on a free end of the elongate member. A ratcheting structure may be configured to control rotation of the spool, and the ratcheting structure may have an engaged position in which the ratcheting structure resists rotation of the spool in an unwind direction of the spool and a disengaged position in which the ratcheting structure permits rotation of the spool in the unwind direction and a wind direction. The rotating shaft may have a first end portion extending through one of the side walls of the frame, with a section of the first end portion having a substantially hexagonal cross-sectional shape for engagement by a tool.

In yet another aspect, the present disclosure relates to a vehicle load securing apparatus for mounting on a vehicle to secure a load to a load bed of the vehicle. The apparatus may comprise a housing substantially enclosing an interior with a dispensing opening into the interior, a spool rotatably mounted in the interior of the housing and including a rotating shaft, and a length of an elongate member at least partially wrapped about the spool, a secured end of the elongate member being secured to the spool and a hook being mounted on a free end of the elongate member. The apparatus may also include a ratcheting structure configured to control rotation of the spool, the ratcheting structure having an engaged position in which the ratcheting structure resists rotation of the spool in an unwind direction of the spool and a disengaged position in which the ratcheting structure permits rotation of the spool in the unwind direction and a wind direction. The apparatus may further include a mounting structure on the housing and configured to removably mount the housing on the vehicle. The mounting structure may comprise a mount hook removably mounted on the housing and an abutment member on the housing positioned opposite of an opening of the mount hook to receive a portion of a mounting channel on the vehicle when the hook is mounted on the housing.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
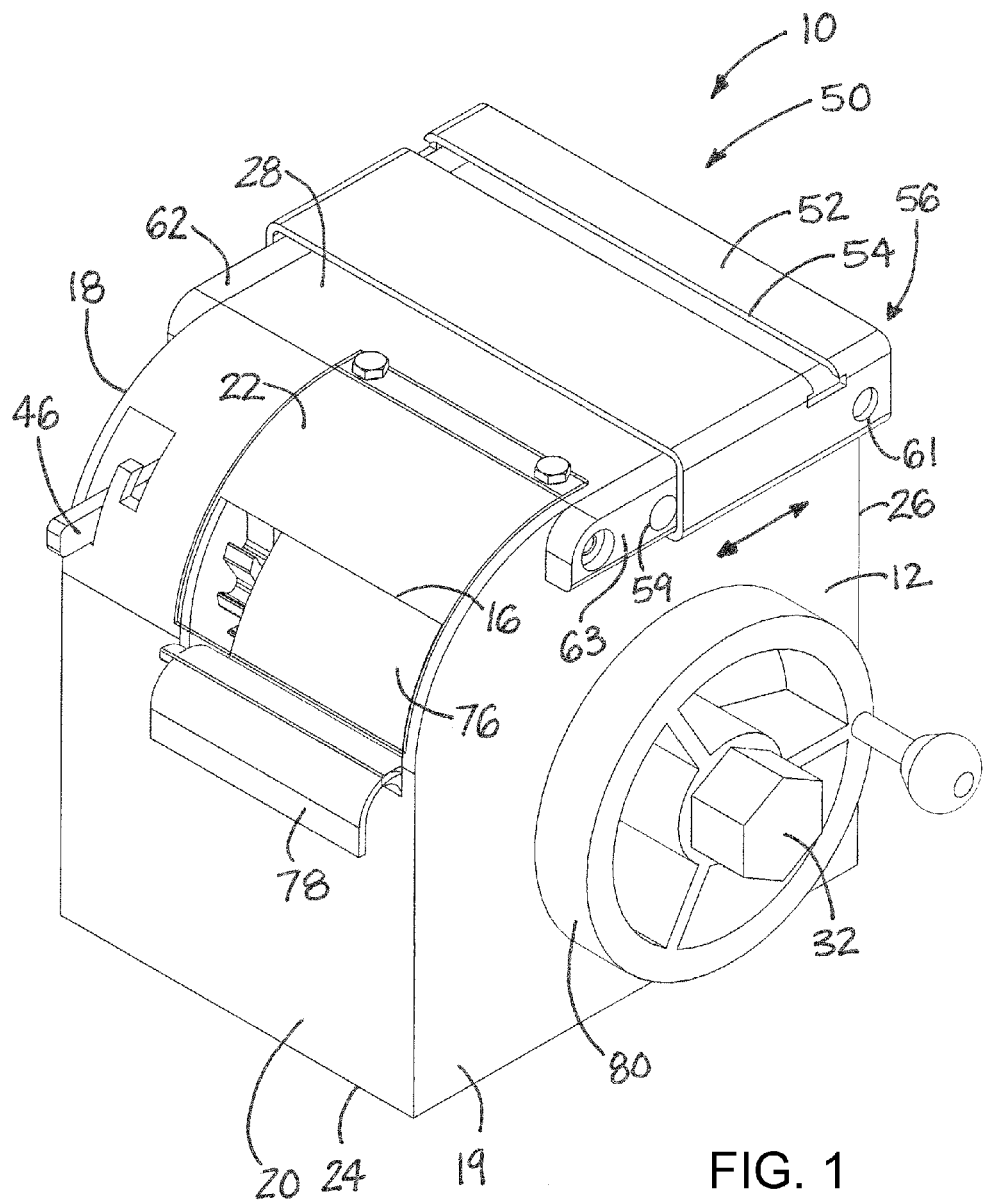
FIG. 1 is a schematic perspective view of a new vehicle load securing apparatus according to the present disclosure.
Figure 2:
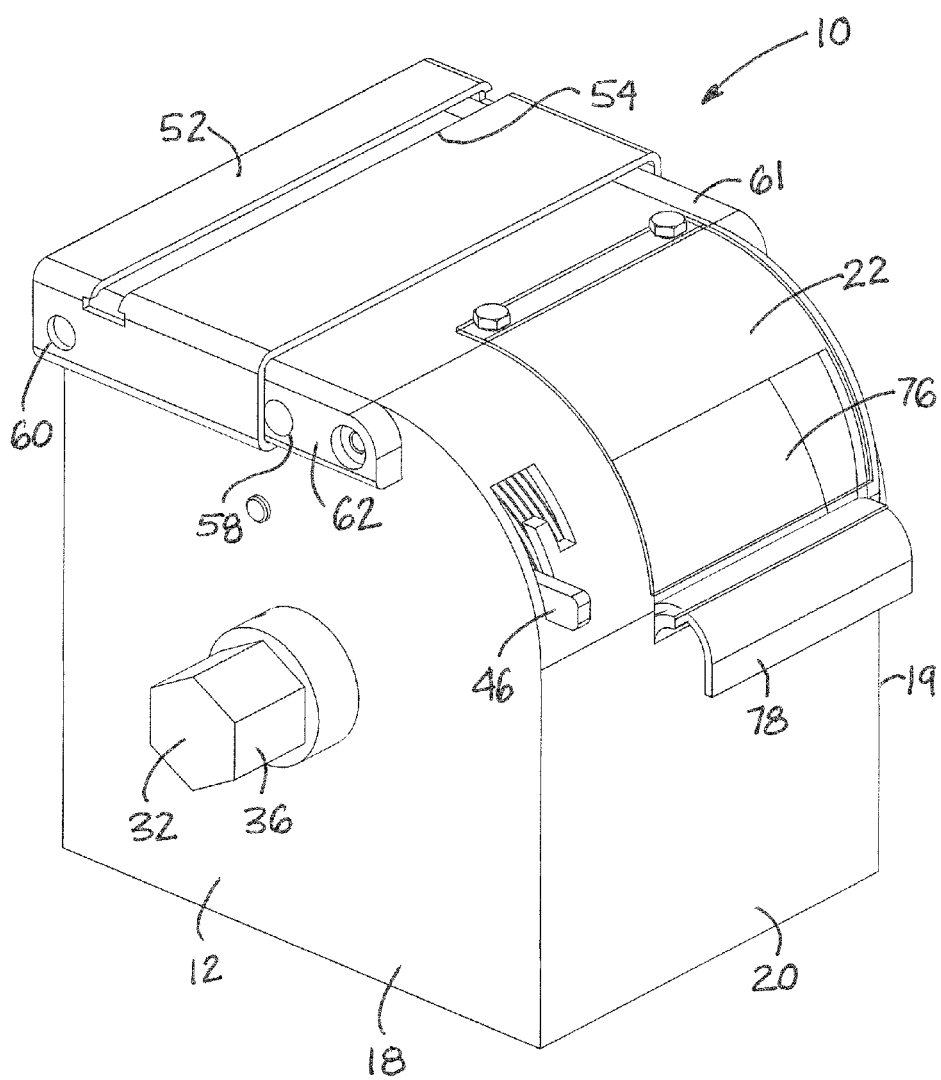
FIG. 2 is a schematic perspective view of the embodiment shown in FIG. 1.
Figure 3:
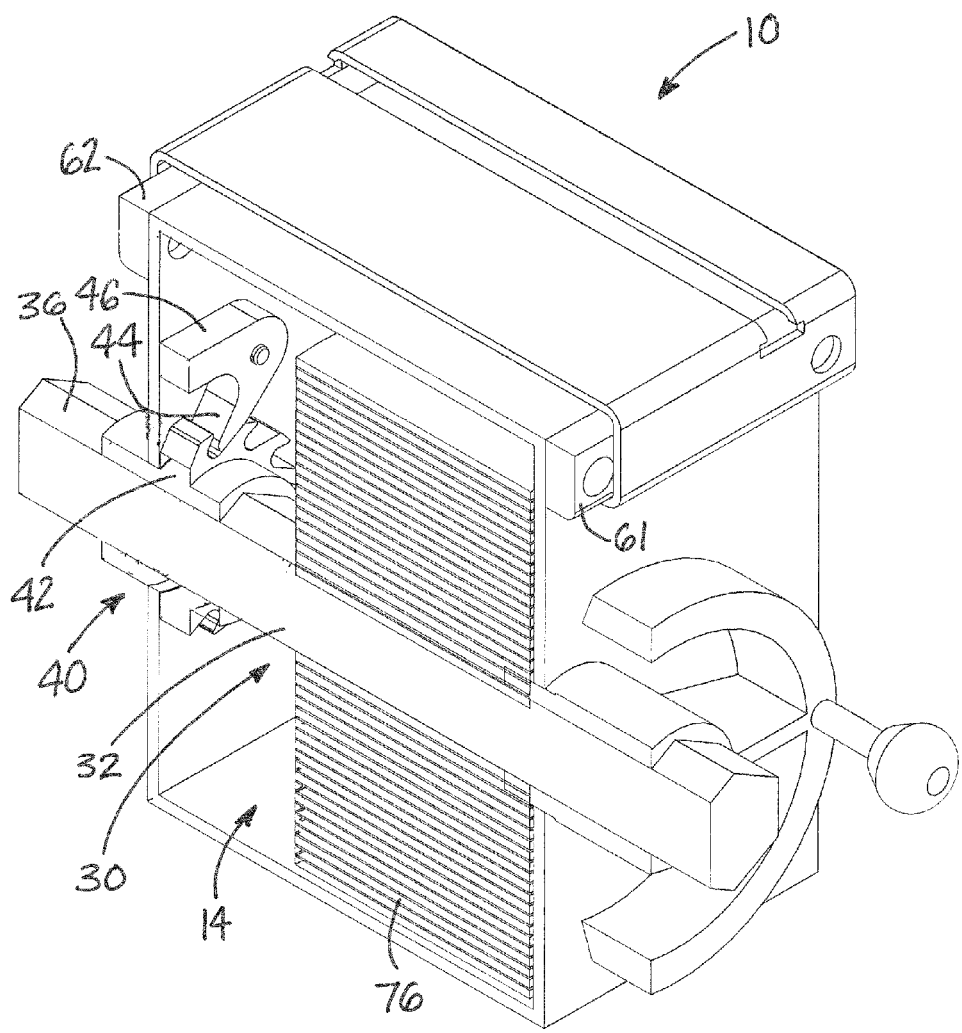
FIG. 3 is a schematic perspective sectional view of the embodiment shown in FIG. 1.
Figure 4:
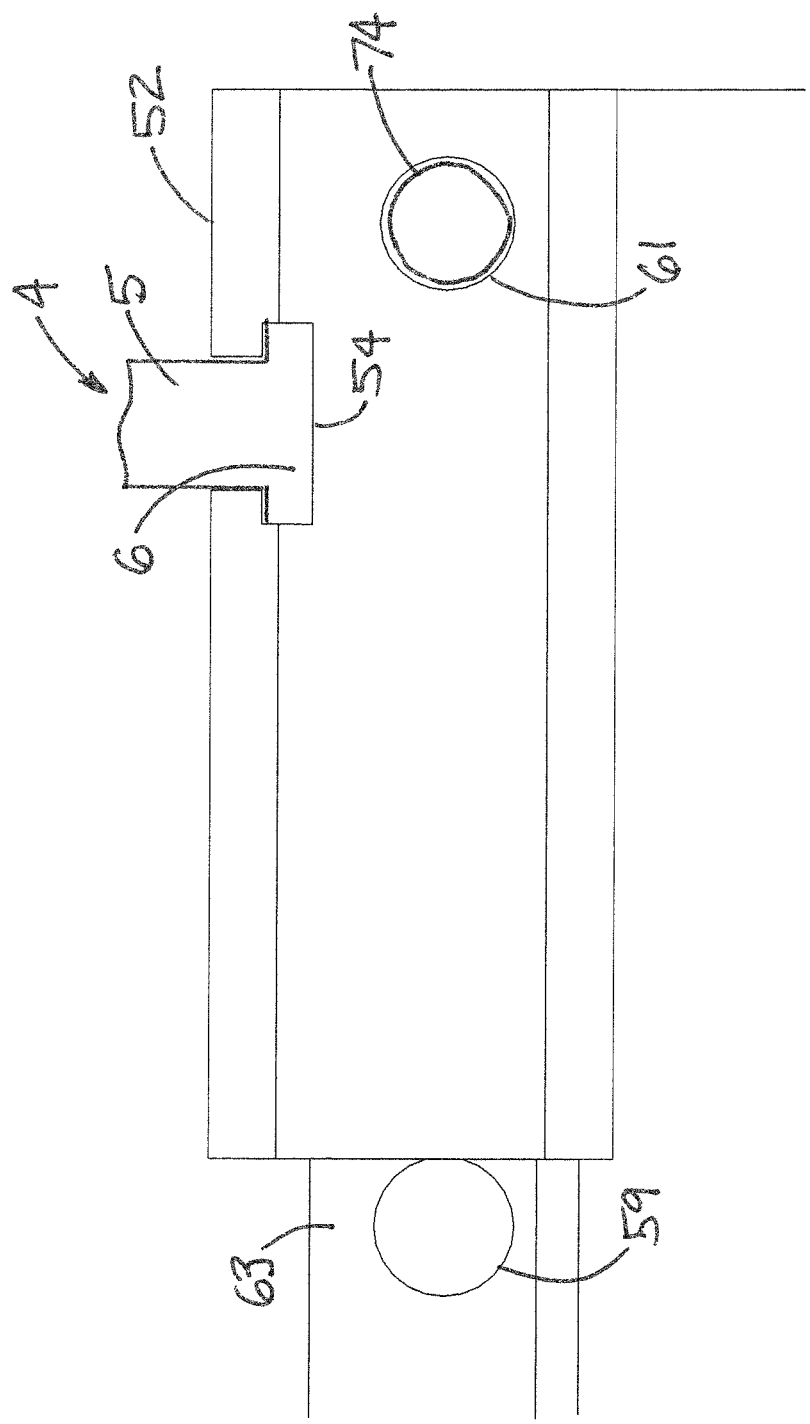
FIG. 4 is a schematic side view of the portion of the embodiment of FIG. 1 showing aspects of the mounting structure.
Figure 5:
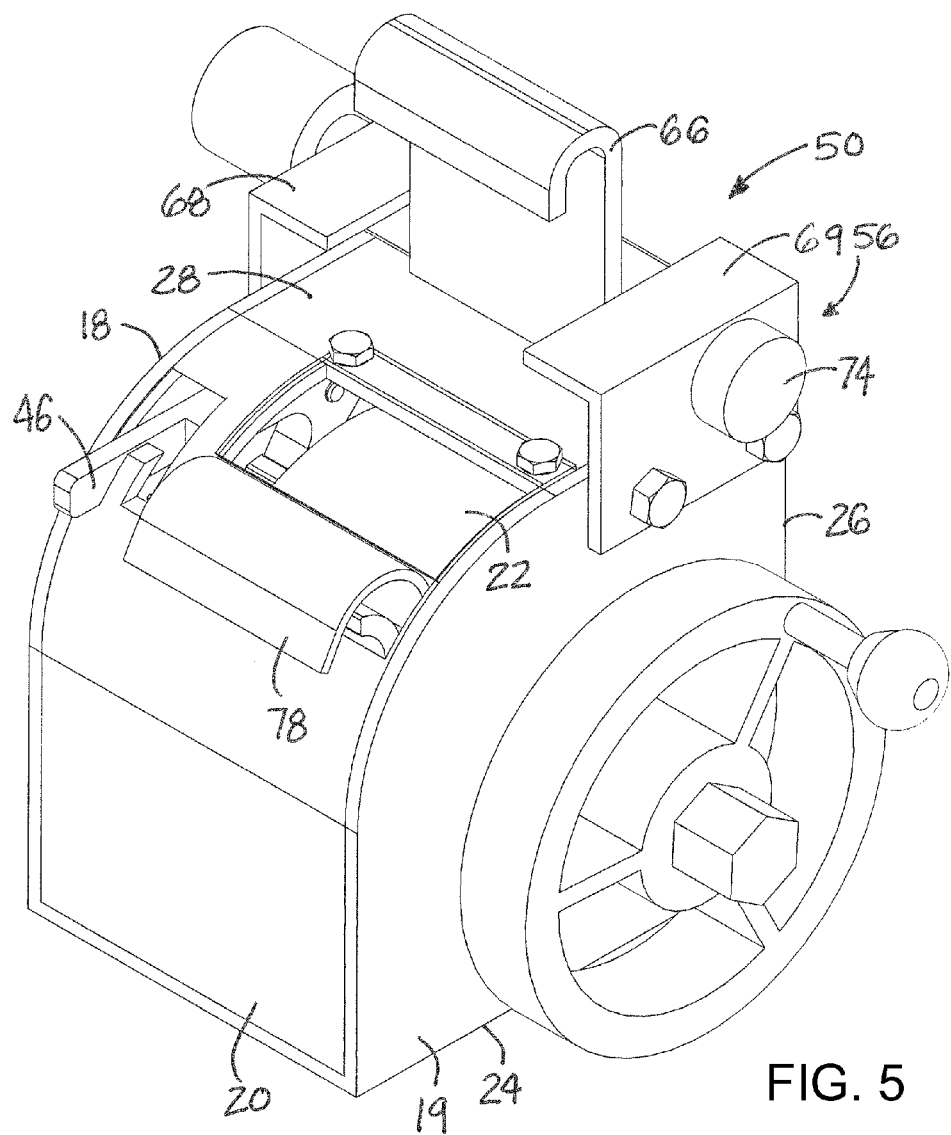
FIG. 5 is a schematic perspective view of another illustrative embodiment of the apparatus of the disclosure.
Figure 6:
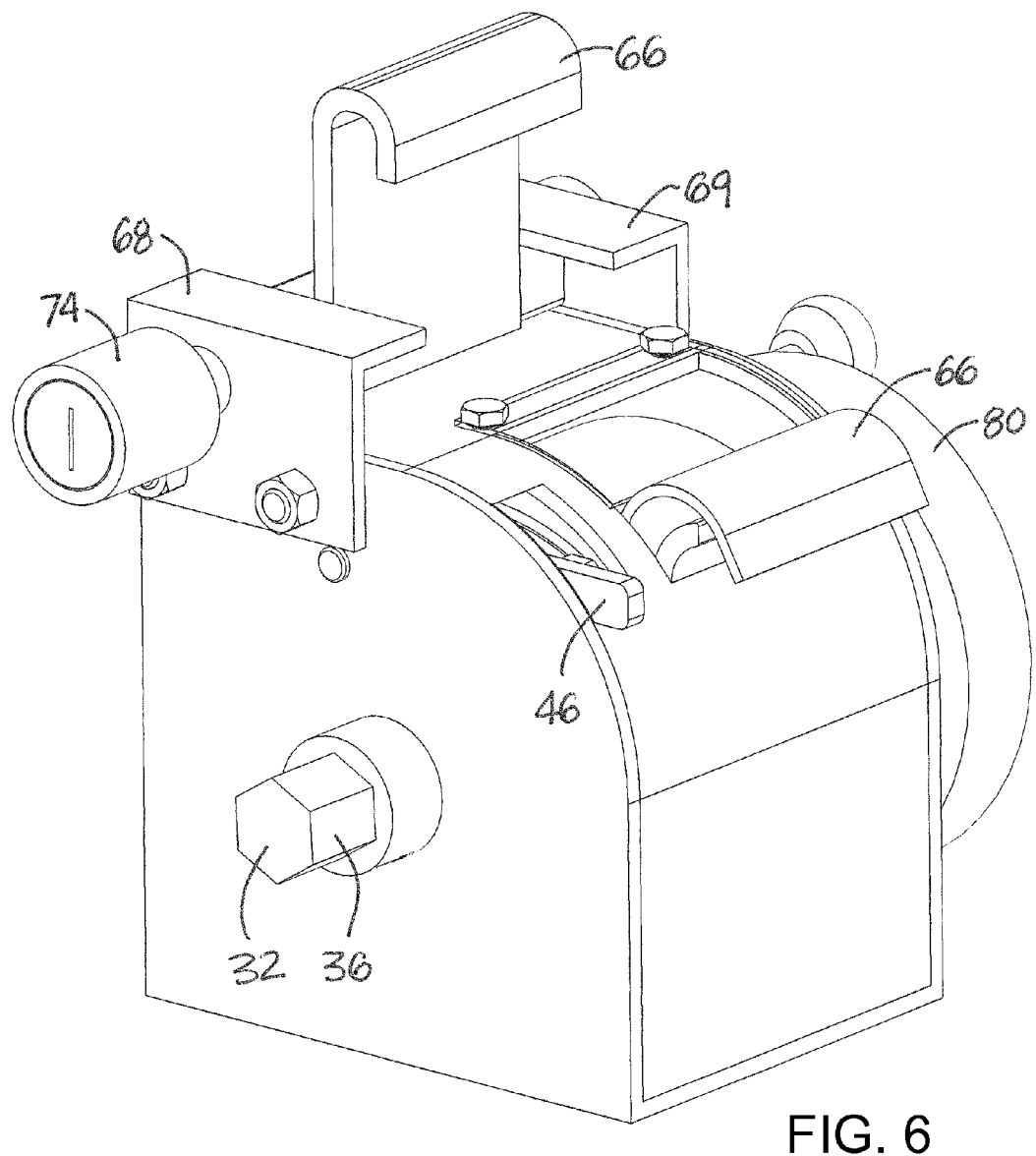
FIG. 6 is a schematic perspective view of the embodiment shown in FIG. 5.
Figure 7:
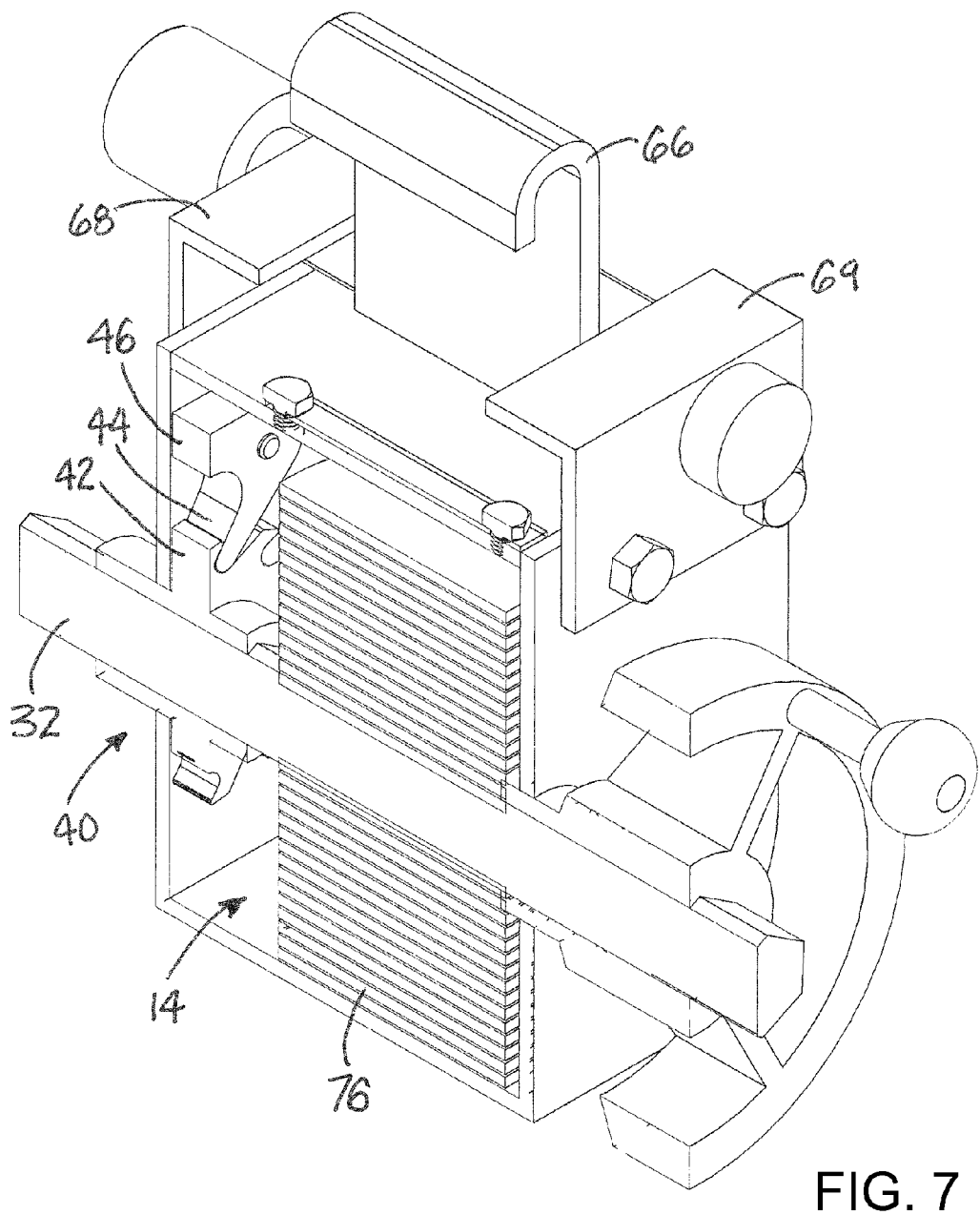
FIG. 7 is a schematic perspective sectional view of the embodiment shown in FIG. 5.
Figure 8:
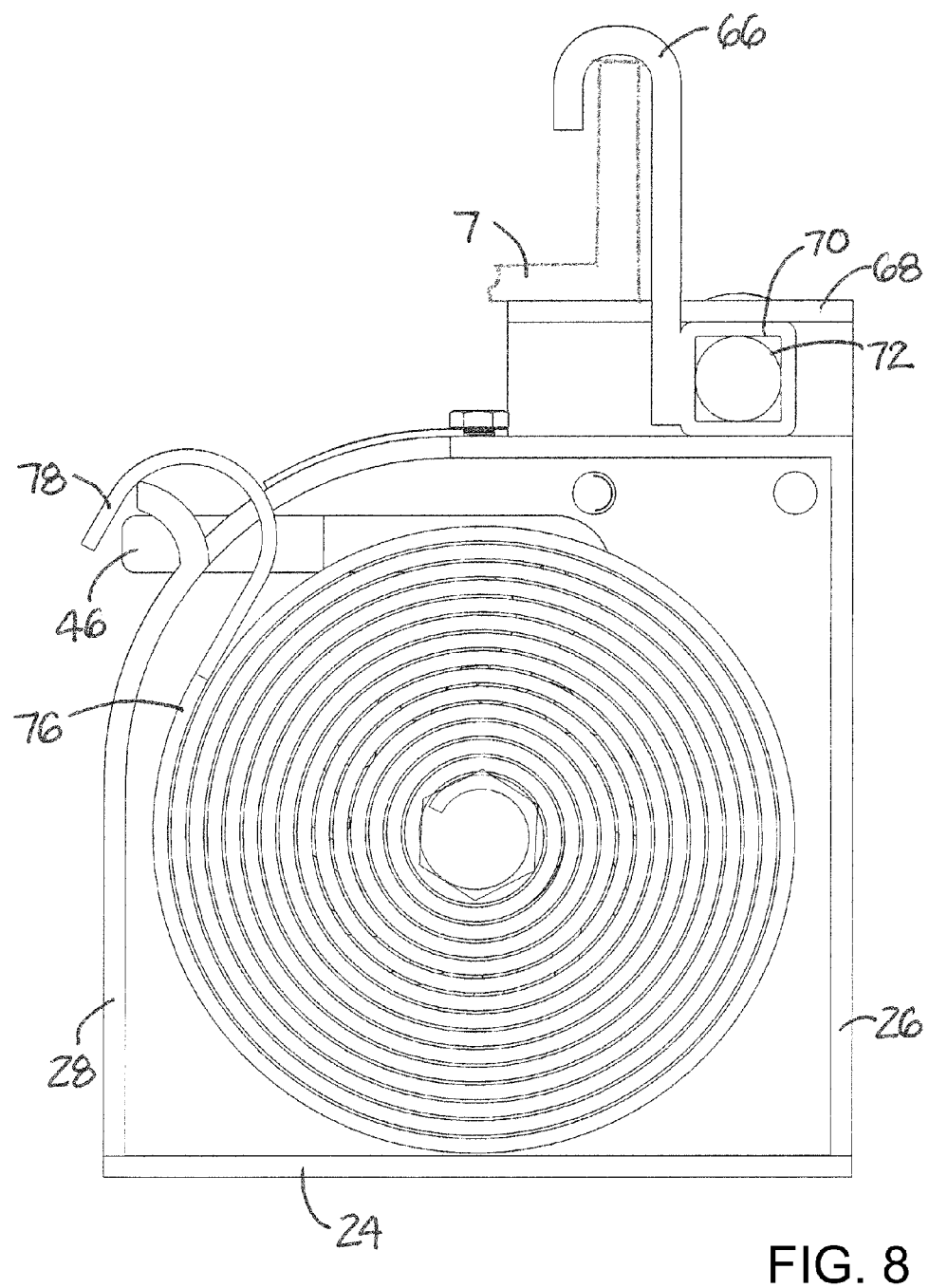
FIG. 8 is a schematic side sectional view of the embodiment shown in FIG. 5.
Figure 9:
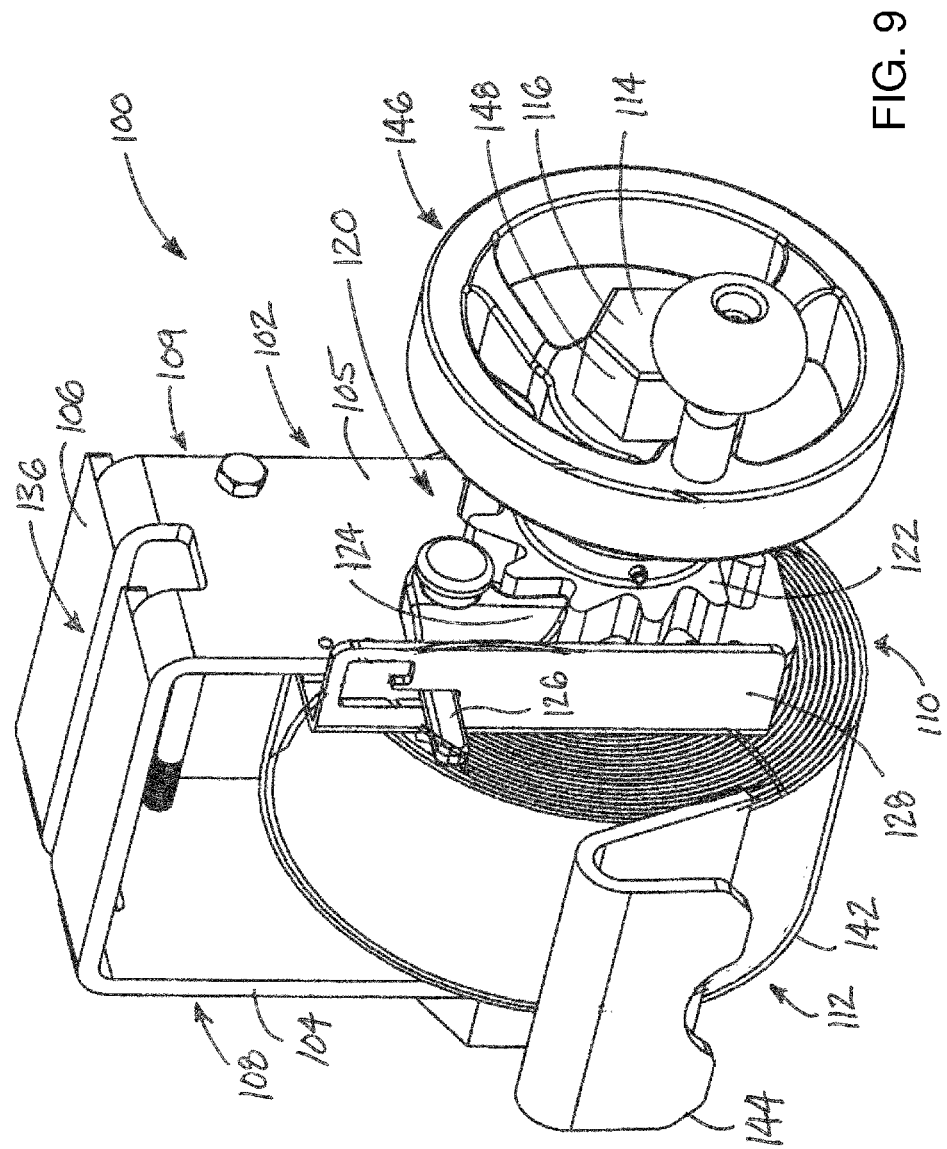
FIG. 9 is a schematic perspective view of another embodiment of the apparatus.
Figure 10:
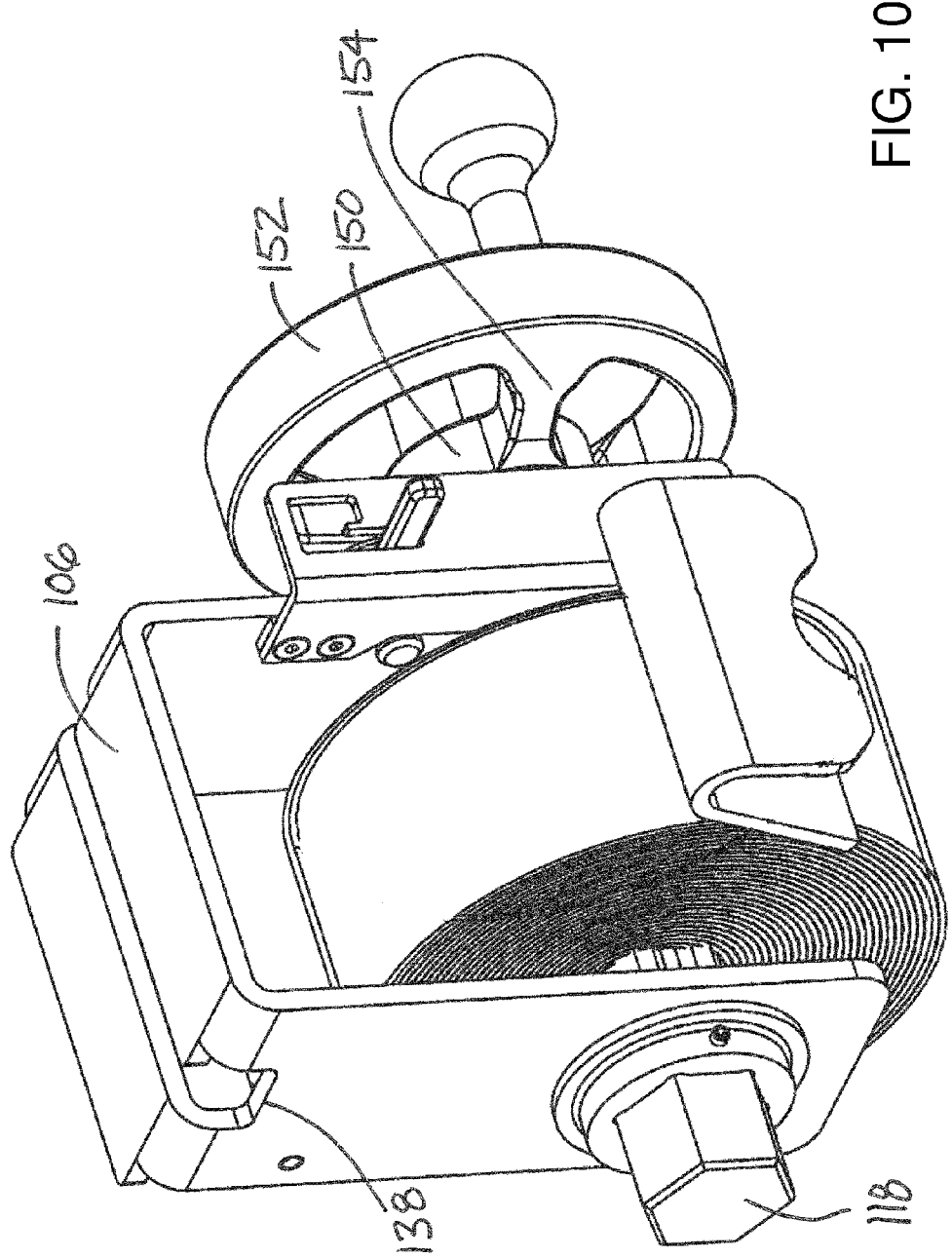
FIG. 10 is a schematic perspective view of the embodiment of FIG. 9 which from another angle.
Figure 11:
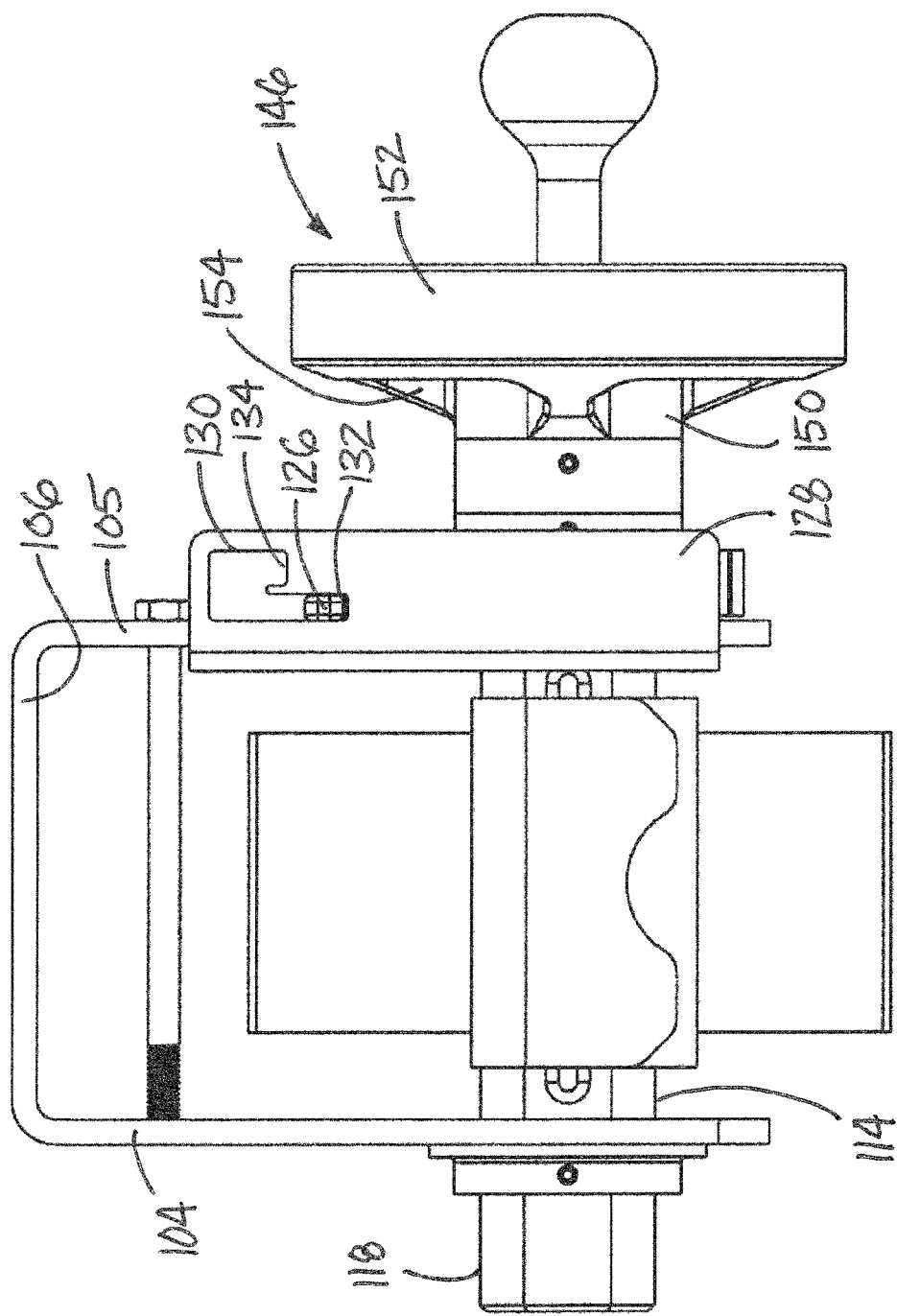
FIG. 11 is a schematic front view of the embodiment of FIG. 9.
Figure 12:
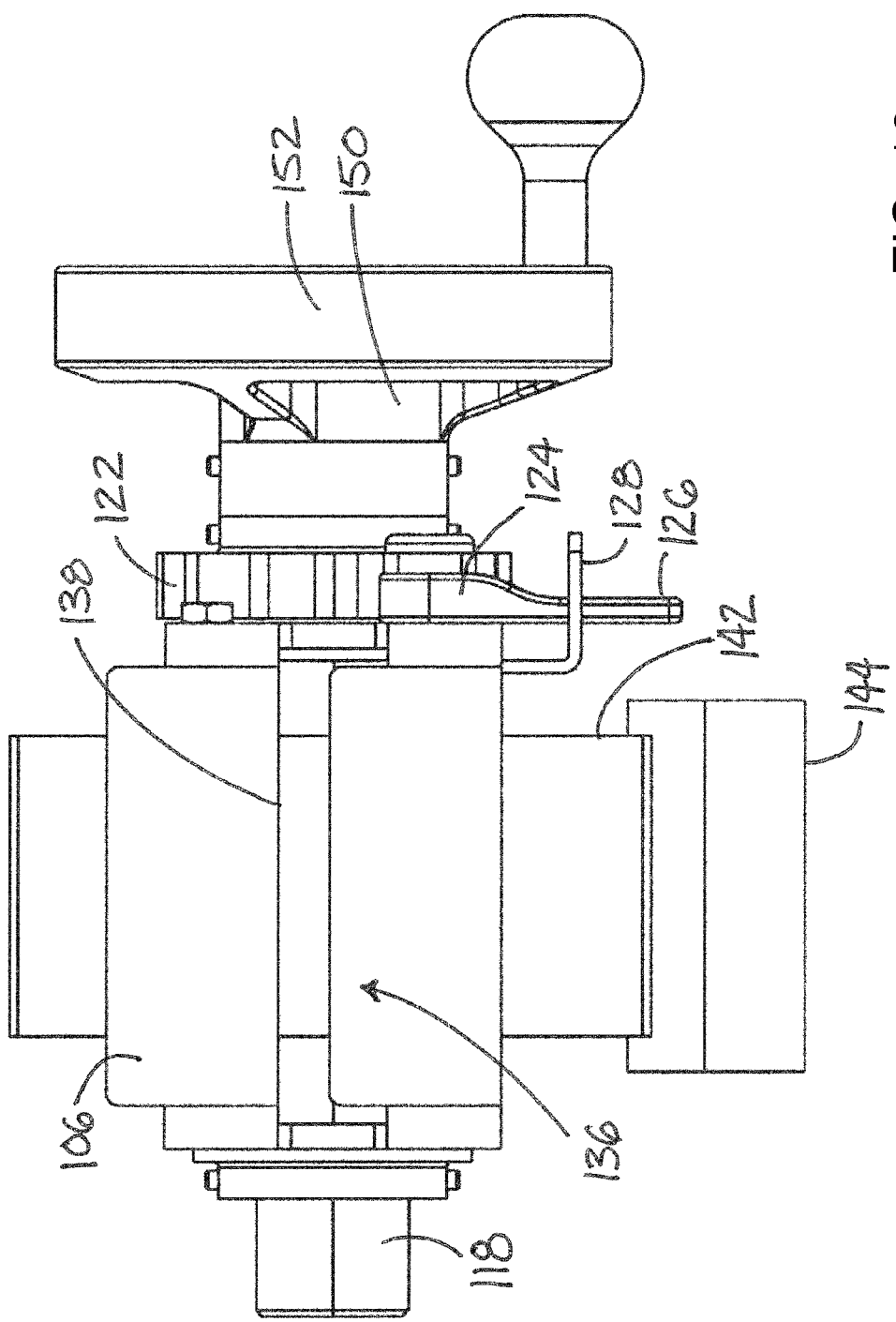
FIG. 12 is a schematic top view of the embodiment of FIG. 9.
Figure 13:
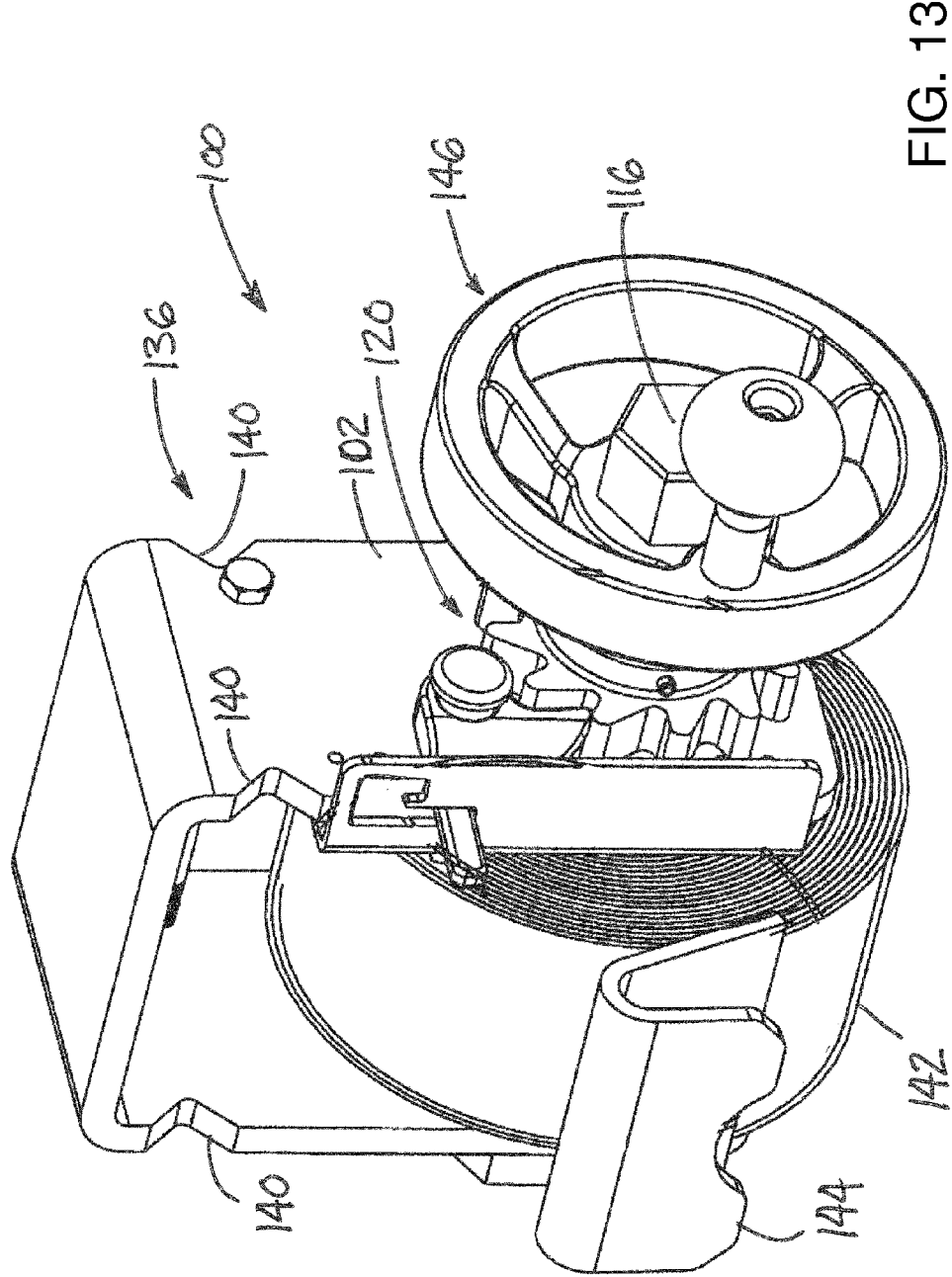
FIG. 13 is a schematic perspective view of a variation of the embodiment of FIG. 9 with a different mounting structure.
Figure 14:
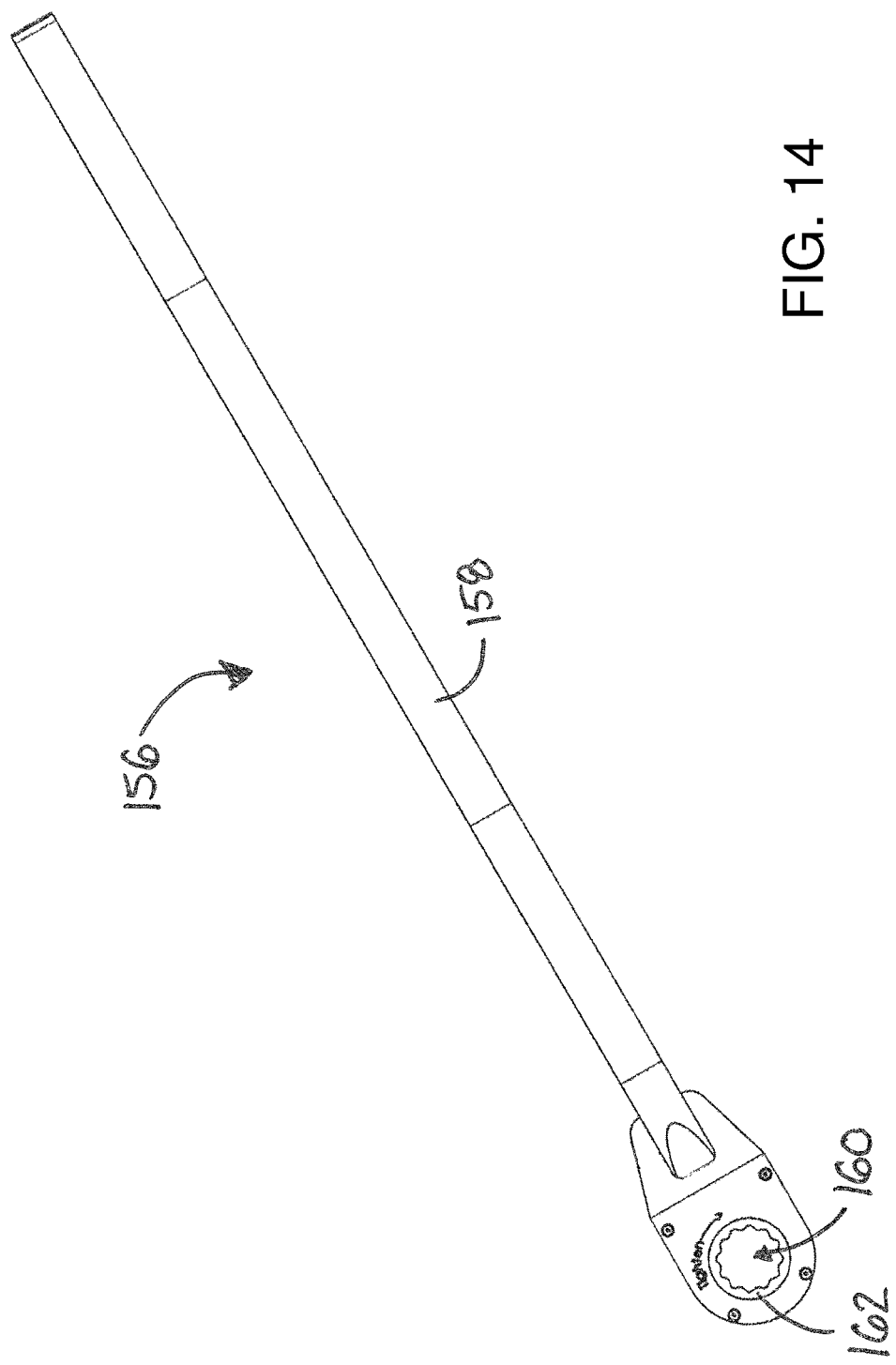
FIG. 14 is a schematic top view of a rotation tool.
Figure 15:
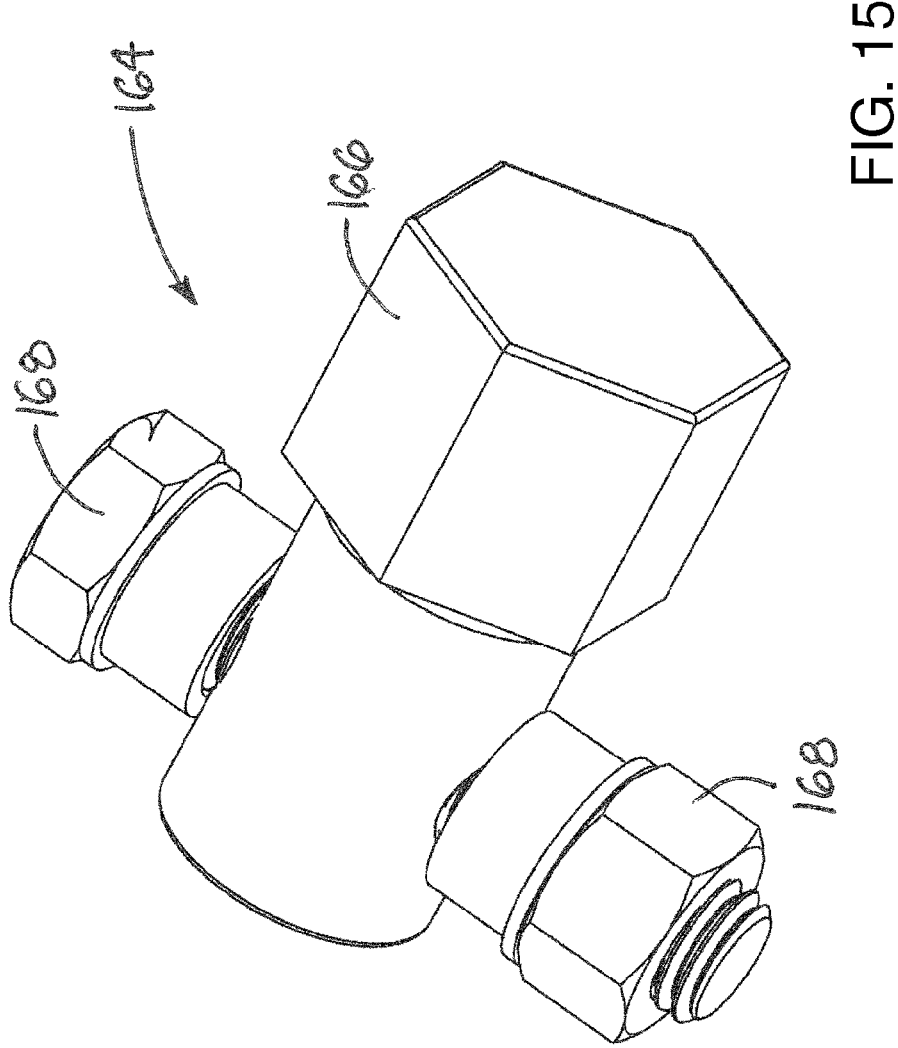
FIG. 15 is a schematic perspective view of a tool adapter.

With reference now to the drawings, and in particular to FIGS. 1 through 15 thereof, a new vehicle load securing apparatus embodying the principles and concepts of the disclosed subject matter will be described.

In some aspects, the disclosure relates to a vehicle load securing apparatus for mounting on a vehicle 1 to help secure the load to the vehicle. The apparatus 10 is highly suitable, for example, to secure a load to a load bed of a vehicle. For the purposes of this disclosure, the vehicle may be a mobile base with or without an engine, such as, for example, a pickup, pickup trailer or semi-trailer. In many applications, the load bed may include a mounting rail 4 extending along at least a portion of the perimeter of the load bed, and in some cases the mounting rail may be mounted on the underside of the load bed, although this is not critical. An illustrative mounting rail may include a web portion 5 and a flange portion 6 with the flange portion being oriented substantially perpendicular to the web portion in a generally T-shaped configuration. In other applications, the apparatus may be used with other structures of the vehicle, such as, for example, a channel 7 extending along a perimeter of the load bed.

The load securing apparatus 10 may include a housing 12 for mounting on the load bed 3 or a mounting element of the load bed such as the aforementioned mounting rail and like. The housing 12 may substantially enclose an interior 14. The housing 12 may also have a dispensing opening 16 that extends from an exterior of the housing into the interior 14. In the illustrative embodiments, the housing 12 includes opposite side walls 18, 19 and a perimeter wall 20 that extends between the side walls. The dispensing opening 16 may be located in the perimeter wall, and in some embodiments a rounded surface may be provided adjacent to the opening to provide a highly suitable surface for the elongate member 76 to rub and reduce friction and the resulting wear. Optionally, a fastener such as a bolt may be extended between the side walls 18, 19 and positioned adjacent to the opening 16 to provide the rounded surface.

A protective flap 22 may extend over the dispensing opening to help deflect moisture and dirt from entering the dispensing opening while still permitting free movement through the opening by the elongate member 76. The protective flap 22 may be formed of a material that is sufficiently flexible to permit deflection from a position over the dispensing opening when the elongate member 76 is being moved through the opening, but should exhibit sufficiently resiliency so that the flap returns to the position over the opening when the movement ceases. In some embodiments, the perimeter wall 20 may include a base wall portion 24, a back wall portion 26, and an upper wall portion 28, with the dispensing opening 16 being located in the upper wall portion of the perimeter wall. Optionally, the flap 22 may be omitted, such as in embodiments in which the dispensing opening is sufficiently constricted in size to limit debris and moisture entry in to the opening.

A spool 30 may be rotatably mounted in the interior 14 of the housing 12 and may include a rotating shaft 32. The rotating shaft 32 may have an end portion 36 that extends through the housing, and the end portion may be configured to being engaged by a rotation tool 38, such as by forming the end portion with a square or hexagonal cross sectional shape. The rotation tool may facilitate manual rotation of the spool, and may be the rotation tool being removably mountable on the end portion 36 of the rotating shaft. In some embodiments, the spool 30 may further include side flanges mounted on the rotating shaft and spaced so that the flexible member is positioned between the flanges when the member is wound about the shaft.

The apparatus 10 may also include a ratcheting structure 40 that is configured to control rotation of the spool 30 with respect to the housing, and thus may be mounted on an element of the spool and on the housing. Illustratively, the ratcheting structure 40 may include a ratchet wheel 42 with teeth formed thereon that is connected to the spool 30 and a pawl 44 that is engagable with the ratchet wheel. The pawl 44 may be movable, and may be movable between an engaged position that is characterized by the pawl resisting rotation of the spool in an unwind direction of the spool, and a disengaged position that is characterized by the pawl permitting rotation of the spool in the unwind direction and a wind direction. The ratcheting structure 40 may be positioned in the interior of the housing, although exterior positioning may also be utilized. The ratcheting structure 40 may also include a release lever 46 that is configured to move the pawl 44 between the engaged position and the disengaged position as the lever is moved.

A significant feature of the load securing apparatus 10 is a mounting structure 50 that may be configured to mount the housing 12 on the vehicle 1, such as on the mounting rail 4 or the perimeter channel 7 of the vehicle. The mounting structure 50 may be located on the housing 12. The mounting structure may include different elements and configurations for mounting on different structures on the vehicle.

For example, as shown in FIGS. 1 through 4, for mounting the housing 12 to a vehicle having a mounting rail 4, the mounting structure 50 may comprise a rail mounting member 52 for receiving a portion of the mounting rail 4. The rail mounting member 52 may define a slot 54 which may be configured to receive a portion of the mounting rail 4 so that the mounting structure, and the housing, may be slidable along the rail to adjust a position of the apparatus 10 on the vehicle. In applications where the mounting rail has a T-shape, the slot 54 may be configured to receive the flange portion 60 and a section of the web portion 5. The rail mounting member 52 may be movably positionable on the housing 12 to adjust a position of the slot 54 with respect to the housing to adjust an offset of the housing. The rail mounting member 52 may be releasably lockable in at least two positions on the housing to adjust the offset. The mounting structure 50 may comprise a locking structure 56 for locking the rail mounting member 52 in at least two different positions on the housing 12. The locking structure 56 may include at least a pair of apertures 58, 59 in the housing and a pair of holes 60, 61 in the rail mounting member 52, with a first one 58 of the apertures and a first one 60 of the holes being alignable in a first position of the rail mounting member on the housing, and a second one 59 of the apertures and a second one 61 of the holes being alignable in a second position of the rail mounting structure on the housing. A post member 74 may be inserted through the aligned voids to lock the position of the rail mounting member. The mounting structure 50 may include at least one guide 62 on which the rail mounting member 52 is mounted, and the mounting structure may include a second guide 63. The rail mounting member 52 may be slidable on the guide or guides between the two or more positions. In use, the mounting rail may be inserted into the slot in the rail mounting member and the housing may be slid along the rail to the desired position, and the position of the rail mounting member on the housing may be adjusted to provide the needed offset from the rail.

As another example, as shown in FIGS. 5 through 8, for mounting the housing to a vehicle having a perimeter channel 7, the mounting structure 50 may comprise a mount hook 66 removably mounted on the housing and an abutment member 68 on the housing, and these two elements may removably secure a portion of the vehicle, such as the perimeter channel, between the mount hook and the abutment member to mount the housing on the vehicle. The mount hook 66 may have a passage 70 formed therein and the abutment member may have a hole 72, and a post member 74 may be insertable into the passage 70 of the mount hook and the hole 72 in the abutment member to secure the mount hook to the abutment member such that the mount hook is removably mounted on the abutment member on the housing. In some embodiments, a pair of the abutment members 68, 69 may be mounted on the housing, and may be positioned on opposite sides of the housing 12 such that the mount hook 66 may be positioned between the abutment members. In use, the mount hook may be hooked on one of the legs of the channel 7 and the passage of the mount hook aligned with the holes in the abutment members so that the leg of the channel is positioned between the mount hook and the abutment members, and then the post member 74 may be inserted through the holes and the passage to hold the mount hook in position with respect to the abutment member. The trapping of the channel leg between the mount hook and the abutment member holds the housing to the vehicle.

The apparatus 10 may also include a length of an elongate member 76 that is at least partially wrapped about the spool 30 and positioned in the interior of the housing. The elongate member 76 is preferably flexible in character to extend and conform to some degree to the shape of the load over which may be extended. A hook 78 may be mounted on a free end of the elongate member, and the opposite end of the elongate member may be mounted or secured to the spool. The hook 78 is preferably adapted to be hooked onto a structure on the vehicle when the elongate member is withdrawn from the housing to a suitable length, such as a location on an opposite side of the load bed. In some of the most preferred embodiments, the elongate member 76 comprises an elongate strap or band of material. The strap may be wound about the spool by rotating the spool in the wind direction, and unwound from the spool by rotating the spool in the unwind direction, or by simply pulling the hook end of the strap from the housing through the dispensing opening. The strap is unwound to approximately the suitable length to extend at least partially about the load, the hook is secured to another location on the vehicle on the opposite side of the load, and the strap may be drawn tight by rotating the spool in the wind direction to draw a portion of the strap back into the housing, with the ratcheting structure holding the strap in the housing.

In other embodiments, the disclosure relates to a vehicle load securing apparatus 100 for mounting on a vehicle, such as a load bed with a mounting rail on the load bed. The apparatus 100 may comprise a frame 102 that is configured to mount on the load bed of the vehicle. In some embodiments, the frame 102 may include opposite side walls 104, 105 and an end wall 106 that extends between the side walls. The frame 102 may have open sides 108, 109 which may be positioned in opposition to each other. The frame may also have an open end 110 which extends between the open sides. The apparatus 100 may also include a spool 112 that is rotatably mounted on the frame, and may be positioned between the side walls 104, 105 of the frame 102 and at the open end of the frame. The spool 112 may include a rotating shaft 114 which may have a first end portion 116 extending through one of the side walls of the frame and a second end portion 118 extending through another one of the side walls. The first 116 and second 118 end portions of the rotating shaft may protrude from the respective side wall. A section or sections of at least one of the end portions may have a substantially hexagonal cross-sectional shape, and the section or sections may be located at a tip of the respective portion of the rotating shaft.

The apparatus 100 may also include a ratcheting structure 120 configured to control rotation of the spool with respect to the frame 102. The ratcheting structure 102 may be mounted on the frame, and may be located exterior of the frame such as adjacent to an exterior surface of one of the side walls, The ratcheting structure 120 may include a ratchet wheel 122 connected to the spool 112 and a pawl 124 engagable with the ratchet wheel. The pawl 124 may have an engaged position resisting rotation of the spool in an unwind direction of the spool and a disengaged position permitting rotation of the spool in the unwind direction and a wind direction. The ratcheting structure 120 may include a release lever 126 configured to move the pawl 124 between the engaged position and the disengaged position. An extension wall 128 may be mounted on the frame and may have a lever aperture 130. The lever aperture 130 may have an engagement location 132 corresponding to the engaged position of the lever and a disengagement location 134 corresponding to disengaged position of the lever. The lever aperture may be configured to resist movement of the lever between the locations without an active and positive movement by the user manipulating the lever.

The apparatus 100 may also include a mounting structure 136 that is configured to mount the frame 102 on the mounting rail of the vehicle. In some embodiments, the mounting structure 136 may comprise a rail mounting structure for receiving a portion of the mounting rail, and may define a slot 138. The slot 138 may be configured to receive a portion of the mounting rail, and may also be configured to receive the flange portion and a section of the web portion of the rail. In some embodiments, the mounting structure 136 may comprise notches 140 formed in the frame 102. The notches 140 may include a pair of notches formed in at least one of the side walls, and may be formed on opposite edges of the side wall. The notches 140 may be formed on opposite locations on each of the side walls of the frame.

A length of an elongate member 142 may be at least partially wrapped about the spool 112. A hook 144 may be mounted on a free end of the elongate member. The elongate member may comprise an elongate strap with a secured end of the strap being secured to the spool.

The apparatus 100 may also include a wheel 146 configured to control rotation of the spool 112. The wheel 146 may be connected to the rotating shaft 114 and may be connected to an end portion of the shaft to rotate with the shaft, and may also be positioned exterior of the frame. A section 148 of the end portion of the rotating shaft may protrude from the wheel opposite of the frame, which may be engaged by a tool adapted to the shape of the end section, such as a 6 point or 12 point socket to engage the hexagonally-shaped cross section of the section 148. The hand wheel 146 may include a hub portion 150 that receives the end portion of the shaft, a rim portion 152 that is spaced radially outwardly from the hub portion, and a plurality of spokes 154 that extend between the hub portion and the rim portion.

A rotation tool 156 may be configured to facilitate manual rotation of the spool, and may be removably mountable on the second end portion 118 of the rotating shaft 114 of the spool. The rotation tool 156 may include a handle 158 for being held by a user in operation of the tool. The tool 156 may have an aperture 160 for receiving a section of the second end portion 118 of the rotating shaft, and the aperture may be formed by a rotating sleeve 162 rotatable with respect to the handle. Rotation of the rotating sleeve may be controlled by a ratcheting mechanism which may be reversible. The aperture 160 in the sleeve may have a shape configured to engage the second end portion and resist rotation of the shaft relative to the sleeve when received in the sleeve, and the shape may be, for example, a 6 or 12 point recess.

A tool adapter 164 may be configured to be mounted on the rotation tool 156 to allow the rotation tool to engage a conventional strap mount having a hollow cylinder with two holes in opposite locations on the cylinder wall. The tool adapter 164 may have a tool portion 166 sized and shaped to be received in the aperture of the rotation tool. The tool adapter 164 may have a fastener 168 mounted thereon that form a pair of stub shafts extending from the central portion, with each of the stub shafts configured to insert into one of the holes in the cylindrical wall of a conventional strap mount, and the stubs 168 may extend in substantially opposite directions. In some embodiments, the fastener comprises a bolt and nut assembly that is removable from the central portion of the adapter to facilitate mounting on the hollow cylinder of the strap mount. Optionally, bushings may be employed on the stub shafts to increase the diameter of the shafts to better fit the holes in the cylindrical wall of the strap mount.

Optionally, a wheel 80 may be provided to control rotation of the spool, and may be mounted on or connected to the rotating shaft 32 of the spool. The wheel may be connected to the end portion 36 of the shaft to rotate with the shaft, and the wheel may be positioned outside of the housing, It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A vehicle load securing apparatus for mounting on a vehicle to secure a load to a load bed of the vehicle, the apparatus comprising:
    a frame for mounting on the load bed of the vehicle, the frame including opposite side walls and an end wall extending between the side walls, the frame having open sides positioned in opposition to each other;
    a spool rotatably mounted on the frame and including a rotating shaft, the spool being adapted to have a length of an elongate member at least partially wrapped about the spool;
    a ratcheting structure configured to control rotation of the spool, the ratcheting structure having an engaged position in which the ratcheting structure resists rotation of the spool in an unwind direction of the spool and a disengaged position in which the ratcheting structure permits rotation of the spool in the unwind direction and a wind direction;
    wherein the rotating shaft has a first end portion extending through one of the side walls of the frame, a section of the first end portion having a substantially hexagonal cross-sectional shape with at least two flat faces formed on opposite exterior sides of the shaft for engagement by a tool.

2. The apparatus of claim 1 wherein the rotating shaft has a second end portion extending through another one of the side walls.

3. The apparatus of claim 2 wherein a section of the second end portion has a substantially hexagonal cross-sectional shape with at least two flat faces formed on opposite exterior sides of the shaft for engagement by a tool.

4. The apparatus of claim 1 additionally comprising a hand wheel mounted on the rotating shaft to rotate as a unit with the shaft.

5. The apparatus of claim 4 wherein the rotating shaft extends through the hand wheel, and the section of the first end portion extends through the wheel and protrudes from the wheel such that the substantially hexagonal cross-sectional shaped section may be engaged by a tool.

6. The apparatus of claim 4 wherein the hand wheel includes a hub portion receiving the end portion of the shaft, a rim portion spaced radially outwardly from the hub portion, and a plurality of spokes extending between the hub portion and the rim portion.

7. The apparatus of claim 1 wherein the ratcheting structure includes a ratchet wheel connected to the spool and a pawl engagable with the ratchet wheel, the pawl having an engaged position resisting rotation of the spool in an unwind direction of the spool and a disengaged position permitting rotation of the spool in the unwind direction and a wind direction, the ratcheting structure being positioned exterior of the frame.

8. The apparatus of claim 7 wherein the ratcheting structure includes a release lever configured to move the pawl between the engaged position and the disengaged position.

9. The apparatus of claim 1 wherein the ratcheting structure includes an extension wall mounted on the frame, the extension wall having a lever aperture into which the lever extends, the lever aperture having an engagement location corresponding to the engaged position of the lever and a disengagement location corresponding to disengaged position of the lever.

10. The apparatus of claim 1 additionally comprising a rotation tool configured to facilitate manual rotation of the spool, the rotation tool being removably mountable on one of said end portions of the rotating shaft of the spool, the tool having an aperture for receiving said end portion of the rotating shaft, the aperture being configured to engage the at least two flat faces formed on opposite exterior sides of the shaft.

11. The apparatus of claim 10 wherein the rotation tool includes an elongated handle extending along an axis radiating outwardly from the aperture.

12. The apparatus of claim 11 additionally comprising a tool adapter configured to be mounted on the rotation tool and a conventional strap mount, the tool adapter having a tool portion having at least two flat faces formed on opposite exterior sides of the shaft to be received in the aperture of the rotation tool, the tool adapter having a pair of stub shafts configured to insert into a conventional strap mount, the stub shafts extending in substantially opposite directions.

13. The apparatus of claim 1 additionally comprising a length of an elongate member at least partially wrapped about the spool, a secured end of the elongate member being secured to the spool and a hook being mounted on a free end of the elongate member.

14. A vehicle load securing apparatus for mounting on a vehicle to secure a load to a load bed of the vehicle, the apparatus comprising
   a frame for mounting on the load bed of the vehicle, the frame including opposite side walls and an end wall extending between the side walls, the frame having open sides positioned in opposition to each other;
   a spool rotatably mounted on the frame and including a rotating shaft, the spool being adapted to have a length of an elongate member at least partially wrapped bout the spool;
   a ratcheting structure configured to control rotation of the spool, the ratcheting structure having an engaged position in which the ratcheting structure resists rotation of the spool in an unwind direction of the spool and a disengaged position in which the ratcheting structure permits rotation of the spool in the unwind direction and a wind direction;
   wherein the rotating shaft has a first end portion extending through one of the side walls of the frame, a section of the first end portion having a substantially hexagonal cross-sectional shape for engagement by a tool;
   a length of an elongate member at least partially wrapped about the spool, a secured end of the elongate member being secured to the spool and a hook being mounted on a free end of the elongate member;
   wherein the rotating shaft has a second end portion extending through another one of the side walls;
   wherein a section of the second end portion has a substantially hexagonal cross-sectional shape for engagement by a tool;
   a hand wheel mounted on the rotating shaft, the rotating shaft extending through the hand wheel, and the section of the first end portion extends through the wheel and protrudes from the wheel such that the section may be engaged by a tool;
   wherein the hand wheel includes a hub portion receiving the end portion of the shaft, a rim portion spaced radially outwardly from the hub portion, and a plurality of spokes extending between the hub portion and the rim portion;
   wherein the ratcheting structure includes a ratchet wheel connected to the spool and a pawl engagable with the ratchet wheel, the pawl having an engaged position resisting rotation of the spool in an unwind direction of the spool and a disengaged position permitting rotation of the spool in the unwind direction and a wind direction, the ratcheting structure being positioned exterior of the frame;
   wherein the ratcheting structure includes a release lever configured to move the pawl between the engaged position and the disengaged position; and
   wherein the ratcheting structure includes an extension wall mounted on the frame, the extension wall having a lever aperture into which the lever extends, the lever aperture having an engagement location corresponding to the engaged position of the lever and a disengagement location corresponding to disengaged position of the lever.

15. A vehicle load securing apparatus for mounting on a vehicle to secure a load to a load bed of the vehicle, the apparatus comprising:
   a frame for mounting on the load bed of the vehicle, the frame including opposite side walls and an end wall extending between the side walls, the frame having open sides positioned in opposition to each other;
   a spool rotatably mounted on the frame and including a rotating shaft, the spool being adapted to have a length of an elongate member at least partially wrapped about the spool;
   a ratcheting structure configured to control rotation of the spool, the ratcheting structure having an engaged position in which the ratcheting structure resists rotation of the spool in an unwind direction of the spool and a disengaged position in which the ratcheting structure permits rotation of the spool in the unwind direction and a wind direction;
   wherein the rotating shaft has a first end portion extending through one of the side walls of the frame, a section of the first end portion having a substantially hexagonal cross-sectional shape with at least two flat faces formed on opposite exterior sides of the shaft for engagement by a tool;
   a rotation tool configured to facilitate manual rotation of the spool, the rotation tool being removably mountable on one of said end portions of the rotating shaft of the spool, the tool having an aperture for receiving said end portion of the rotating shaft, the aperture being configured to engage the at least two flat faces formed on opposite exterior sides of the shaft, the rotation tool having an elongated handle extending along an axis radiating outwardly from the aperture.

16. The apparatus of claim 15 additionally comprising a tool adapter configured to be mounted on the rotation tool and a conventional strap mount, the tool adapter having a tool portion having at least two flat faces formed on opposite exterior sides of the shaft to be received in the aperture of the rotation tool, the tool adapter having a pair of stub shafts configured to insert into a conventional strap mount, the stub shafts extending in substantially opposite directions.

17. The apparatus of claim 15 wherein the aperture of the rotation tool is formed by a rotating sleeve rotatable with respect to the handle, wherein rotation of the rotating sleeve is controlled by a ratcheting mechanism.

* * * * *